ced Nov. 13, 1962

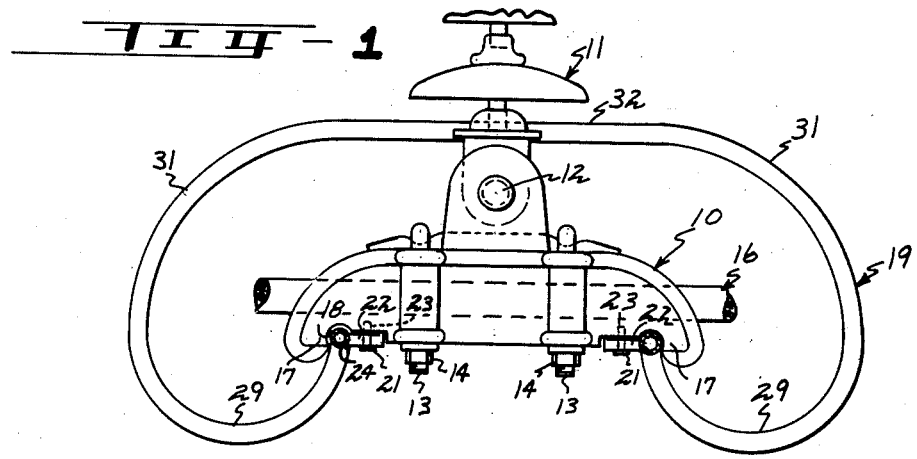
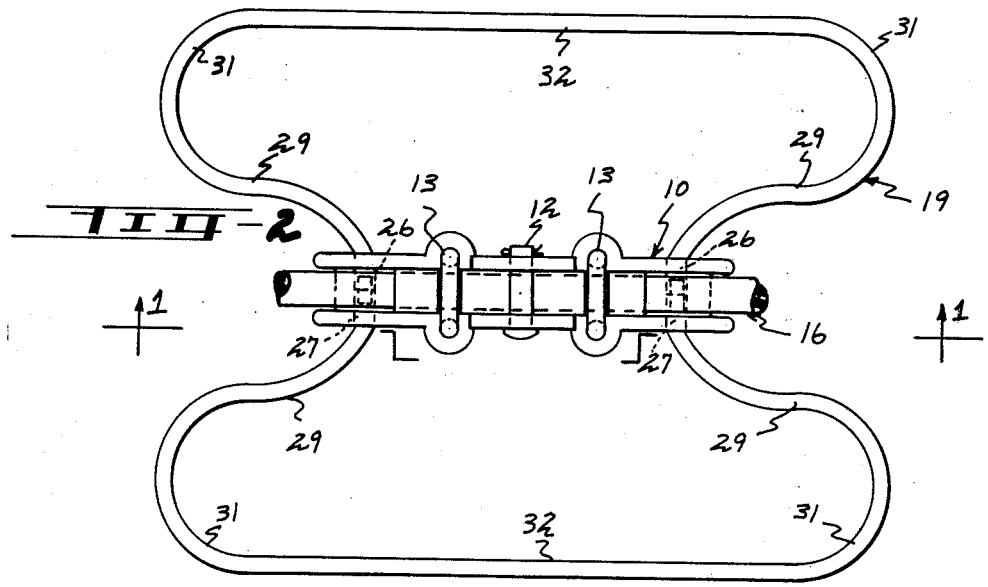
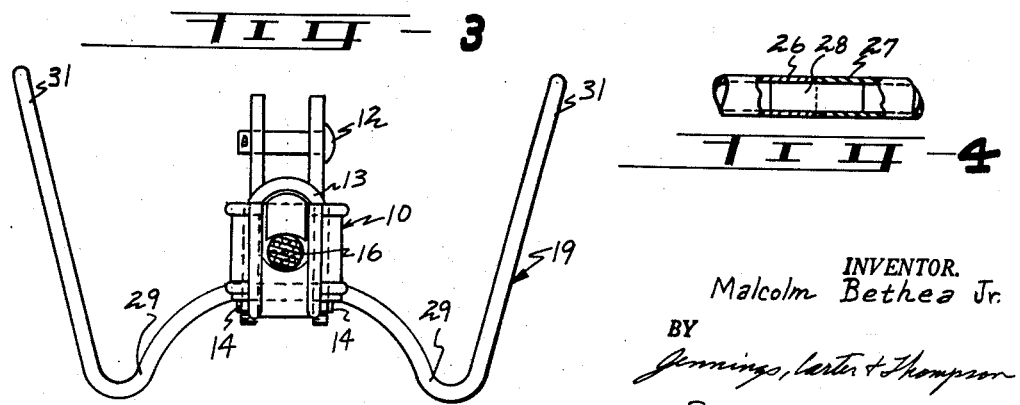

3,064,074
ELECTRICAL SUSPENSION CLAMP
Malcolm Bethea, Jr., Birmingham, Ala.
Filed Oct. 27, 1961, Ser. No. 148,110
9 Claims. (Cl. 174—144)

This invention relates to an electrical suspension assembly and more particularly to means for attaching loop-like control members, such as corona shields and the like to suspension clamps.

An object of my invention is to provide an electrical suspension assembly in which the loop-like control member is supported from the suspension clamp at two spaced-apart points to thus reduce the effects of vibration to a minimum whereby the loop-like control member does not become loose while in use and the metal from which the control member is formed does not become fatigued.

Another object of my invention is to provide an electrical suspension assembly of the character designated which may be easily assembled and disassembled, thereby particularly adapting the assembly for installation and removal under energized conditions.

A further object of my invention is to provide an electrical suspension assembly of the character designated in which the loop-like control member is snapped into operating position where it is temporarily held by its own action until it may be firmly secured to the suspension clamp, thereby reducing the number of workers required to install the same and at the same time reducing the hazardous working conditions which are usually incurred where a group of workers are required to install such suspension assemblies.

A still further object of my invention is to provide an electrical suspension assembly of the character designated which shall be simple of construction, economical of manufacture and one in which the loop-like control member is of such a length that its snaps into operating position due to its own resilience, thereby making the same trouble free in operation due to the fact that there is no undue stress on any part of the loop-like control member as it is installed or removed.

Heretofore in the art to which my invention relates, various means have been employed for connecting loop-like control members, such as corona shields and the like to suspension clamps. Usually, inwardly extending brackets are secured to the loop-like control members and the brackets are in turn secured to the suspension clamps or other apparatus associated therewith by nuts and bolts. Not only is it difficult to reach the inconvenient locations where the control members are attached to the suspension assembly, but the installation and removal of the control members requires several workers to hold the control members in place as the securing means is applied or removed. Also, the support bracket for the control member is usually secured to the suspension assembly at one point and adjacent the center of the support bracket whereby excessive vibrations are encountered. Such vibrations cause the hardware associated with the suspension assembly and the support bracket to become loosened and also the metal forming the control member becomes fatigued whereby the control member is required to be replaced. In addition to the replacement of the control members due to fatigue thereof, the control members must often be replaced due to damage caused by icing conditions, winds and where the control members are damaged by electrical flash over. In view of the fact that the loop-like control members must be replaced often, it is very desirable to have a minimum number of workers for installing and removing the control members, especially under energized conditions.

Briefly, my improved electrical suspension assembly comprises a suspension clamp having a pair of clamping jaws on its under-surface adjacent the ends thereof. A generally loop-like control member of a length for portions thereof to resiliently snap into position between each pair of clamping jaws extends along opposite sides of the suspension clamp and through both pairs of the clamping jaws whereby the loop-like member is supported at two spaced apart points which are located adjacent the ends of the suspension clamp. At least one of each set of clamping jaws is movable whereby the loop-like control member may be firmly secured in place after it is first snapped into position between the fixed clamping jaws at each end of the clamp.

An electrical suspension assembly embodying features of my invention is illustrated in the accompanying drawings, forming a part of this application, in which:

FIG. 1 is a sectional view taken generally along the line 1—1 of FIG. 2;

FIG. 2 is a top plan view of the suspension assembly, the conductor being partly broken away and in section and the insulator connection being omitted for the sake of clarity;

FIG. 3 is an end view of the assembly shown in FIG. 2, the electrical conductor being shown in section; and, FIG. 4 is an enlarged view, partly in section, showing the connection between the two sections of the loop-like control member.

Referring now to the drawing for a better understanding of my invention, I show a suspension clamp 10 which is supported from an insulator assembly indicated generally at 11 by a pivot pin 12. The suspension clamp 10 is provided with the usual U-bolts 13 having nuts 14 whereby the suspension clamp is secured to an electrical conductor 16.

Formed integrally with the undersurface of the suspension clamp 10 are fixed clamping jaws 17 which are positioned adjacent opposite ends of the suspension clamp, as shown in FIG. 1. The fixed clamping jaws 17 are provided with arcuate recesses 18 for engaging a loop-like control member 19. Mounted on the under-surface of the suspension clamp 10 by cap screws 21 are movable clamping jaws 22. Suitable threaded openings 23 are provided in the suspension clamp 10 for receiving the cap screws 21 whereby the movable clamping jaws move into firm engagement with the adjacent surface of the loop-like control member 19 upon tightening the cap screws 21. As shown in FIG. 1, each movable jaw 22 is provided with an arcuate face 24 which faces the arcuate face 18 of the fixed clamping jaw 17. The arcuate faces 18 and 24 are spaced from each other, when the cap screw 21 is loosened, whereby the adjacent portion of the loop-like member 19 is adapted to snap into place between the faces 18 and 24. Also, the portions of each loop-like member 19 which engage the fixed clamping jaws 17 are spaced from each other a distance greater than the distance between jaws 17 whereby the loop-like member 19 snaps into the jaws 17 and is retained in place initially by its engagement with the jaws 17 until the cap screws 21 are tightened to bring movable jaw 22 into clamping position.

The loop-like control member 19 is preferably formed in two sections having abutting end portions 26 and 27, as clearly shown in FIG. 4. Telescopically engaging the abutting end portions 26 and 27 of the loop-like control member 19 is a plug member 28 which holds the two sections of the control member in assembled relationship. While I have shown the loop-like member 19 as being formed in two sections it will be apparent that the member could be formed of a single length of tubular material or the like. The loop-like member 19 extends downwardly and outwardly from the end portions 26 and 27 as at 29 and then extends upwardly and inwardly as at 31 to define side portions 32 which extend alongside the suspension bracket 10, as shown.

From the foregoing description, the installation of my improved suspension assembly will be readily understood. To install the loop-like member 19 on the suspension clamp 10, the cap screws 21 are unscrewed from the openings 23 whereby the arcuate face 24 is spaced from the arcuate face 18 a distance to permit the adjacent portion of the loop-like member 19 to snap between the adjacent faces. The loop-like control member 19 is thus installed by merely pressing the end portions 26 and 27 thereof into the arcuate recesses 18 of the jaws 17 at each end of the clamp and concurrently between the adjacent jaws 17 and 22. In view of the fact that the loop-like member 19 is of a substantial length, the resilience of the member permits the member to readily snap into operating position between jaws 17 at each end of the clamp with a minimum of effort. The clamping jaws 17 retain the loop-like control member in this operating position until the worker can tighten the cap screws 21. Upon tightening the cap screws 21, the loop-like control member 19 is anchored firmly to the suspension clamp 10 at two spaced apart points which are located adjacent the ends of the suspension clamp, thereby providing a sturdy construction which prevents vibration.

To remove the loop-like control member 19 from the suspension clamp 10, the worker merely releases the cap screws 21 whereupon the arcuate face 24 moves away from the arcuate face 18 a distance to permit the adjacent portions of the loop-like member 19 to snap out of the clamping jaws. Another loop-like control member may then be installed as described hereinabove by merely snapping the same in place and then tightening the cap screws 21. It will be noted that the cap screws 21 are not removed entirely from the threaded openings 23 as the loop-like members are installed and removed, thereby facilitating installation and removal of the control members.

From the foregoing, it will be seen that I have devised an improved electrical suspension assembly. By providing a loop-like control member which is snapped into place due to its own resilience, the worker can temporarily attach the loop-like member to the suspension clamp whereby it is held in place until the cap screws 21 are tightened to secure the loop-like member firmly in place. Also, by providing a loop-like control member which is anchored firmly at two points adjacent the ends of the suspension clamp, I reduce vibration of the loop-like member and the parts connected thereto to a minimum, thereby greatly increasing the life of the control member 19. Furthermore, by mounting the clamping jaws adjacent the ends of the suspension clamp and on the undersurface thereof, the clamping jaws are in position for the worker to install the loop-like control members 19 by merely pressing the same upwardly into the clamping jaws, thereby eliminating the necessity of the worker having to work over and around the electrical conductors.

While I have shown the fixed jaw 17 as facing inwardly, it will be apparent that the fixed jaw could face outwardly whereby the movable jaws 22 would be outwardly of the fixed jaws. Also, while I have shown the portions 26 and 27 as resiliently engaging the arcuate recesses of the fixed jaws, it will be apparent that the portions 26 and 27 could resiliently engage the movable jaws.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. An electrical suspension assembly comprising a suspension clamp having a pair of clamping jaws adjacent each end thereof, a loop-like control member disposed to snap between the jaws of each pair of clamping jaws whereby said control member is held in place, said control member extending from the pair of clamping jaws adjacent one end of said suspension clamp to the pair of clamping jaws adjacent the other end thereof, and means to move at least one clamping jaw of each pair of clamping jaws toward its associated jaw whereby said control member is secured to said suspension clamp after said control member is positioned between said clamping jaws.

2. An electrical suspension assembly as defined in claim 1 in which one of the clamping jaws of each pair of clamping jaws is formed integrally with the suspension clamp.

3. An electrical suspension assembly as defined in claim 1 in which each pair of clamping jaws is provided with a fixed jaw and the distance between the portions of the loop-like control member which engage said fixed jaws is greater than the distance between said fixed jaws whereby said loop-like control member is held resiliently in place until the other jaws can be moved to clamping position.

4. An electrical suspension assembly comprising a suspension clamp having a pair of clamping jaws adjacent each end thereof, a loop-like control member disposed to snap resiliently into position between the jaws of both pairs of clamping jaws whereby said control member is held in place, said control member being of a length to extend along opposite sides of the suspension clamp and through both pairs of clamping jaws, and means to move at least one clamping jaw of each pair of clamping jaws toward its associated jaw whereby said control member is secured to said suspension clamp after said control member is positioned between said clamping jaws.

5. An electrical suspension assembly as defined in claim 4 in which the loop-like control member comprises two sections which are connected to each other adjacent the points of contact with the clamping jaws.

6. An electrical suspension assembly as defined in claim 4 in which the loop-like control member comprises two tubular sections with the ends of one section disposed to abut the ends of the other section within the clamping jaws, and connector members telescopically engaging the abutting ends of said tubular sections whereby said abutting ends are connected to each other.

7. An electrical suspension assembly comprising an elongated suspension clamp, a stationary clamping jaw adjacent each end of said suspension clamp, a movable clamping jaw facing each stationary clamping jaw and adapted for movement toward and away from said stationary clamping jaw, a loop-like control member of a size to snap between said stationary clamping jaws and their associated movable clamping jaws while said movable clamping jaws are moved away from said stationary clamping jaws, said loop-like control member being of a length to extend along opposite sides of the suspension clamp and through both pairs of clamping jaws, and means to move said movable clamping jaws toward said stationary clamping jaws after the loop-like control member is positioned therebetween whereby said loop-like control member is secured to said suspension clamp.

8. An electrical suspension assembly as defined in claim 7 in which the loop-like control member extends outwardly and downwardly adjacent each end of the suspension clamp and then extends upwardly and inwardly along opposite sides of the extension clamp.

9. An electrical suspension assembly as defined in claim 7 in which the clamping jaws are positioned on the undersurface of the suspension clamp adjacent the ends thereof.

No references cited.